July 8, 1969     B. W. LARSEN     3,454,188

MEANS FOR WELDING BAIL EARS TO CONTAINERS

Filed Jan. 23, 1967

INVENTOR.
BENT WERDELIN LARSEN

BY

Ralph R. Roberts
AGENT

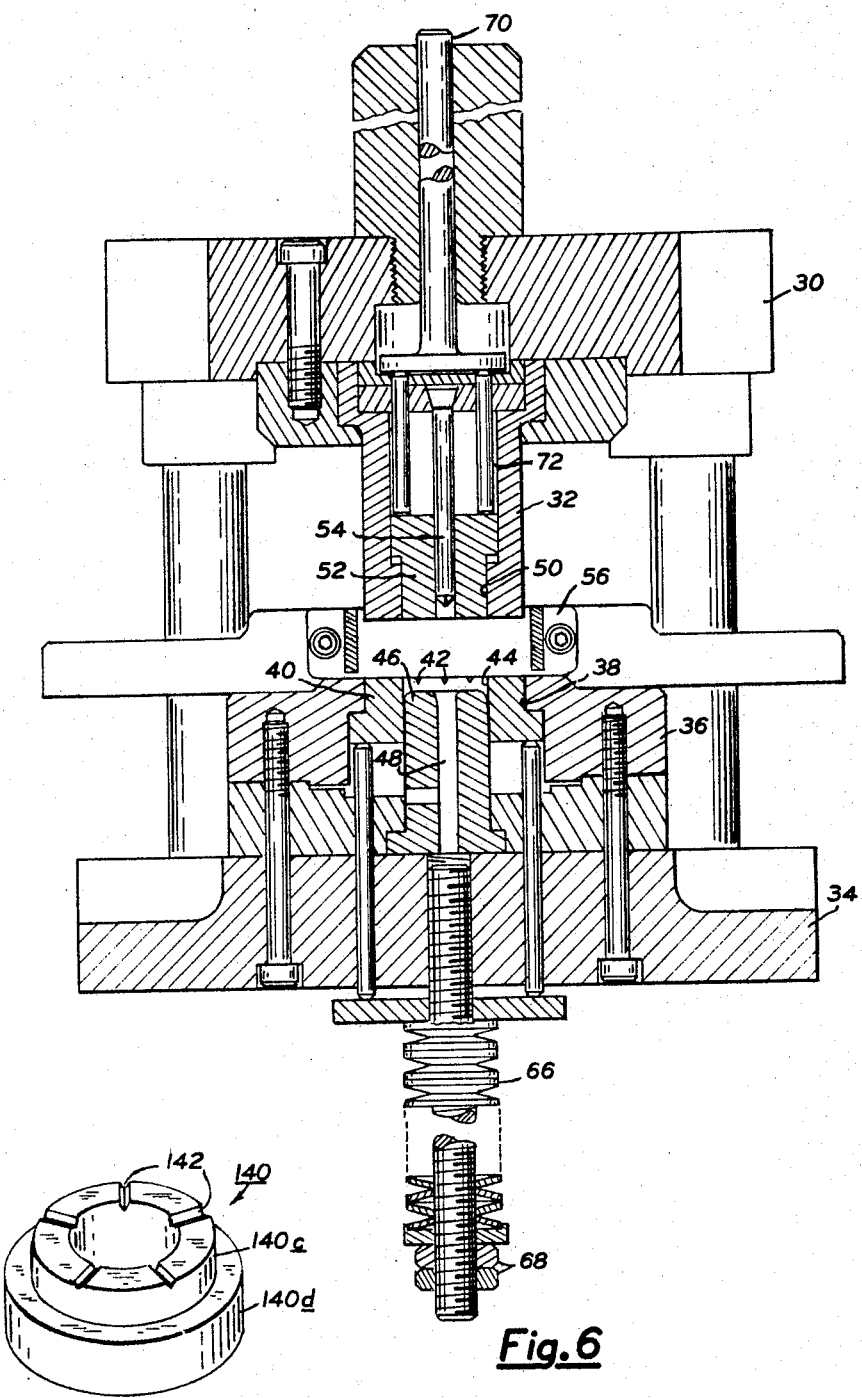

July 8, 1969 B. W. LARSEN 3,454,188
MEANS FOR WELDING BAIL EARS TO CONTAINERS
Filed Jan. 23, 1967 Sheet 3 of 3
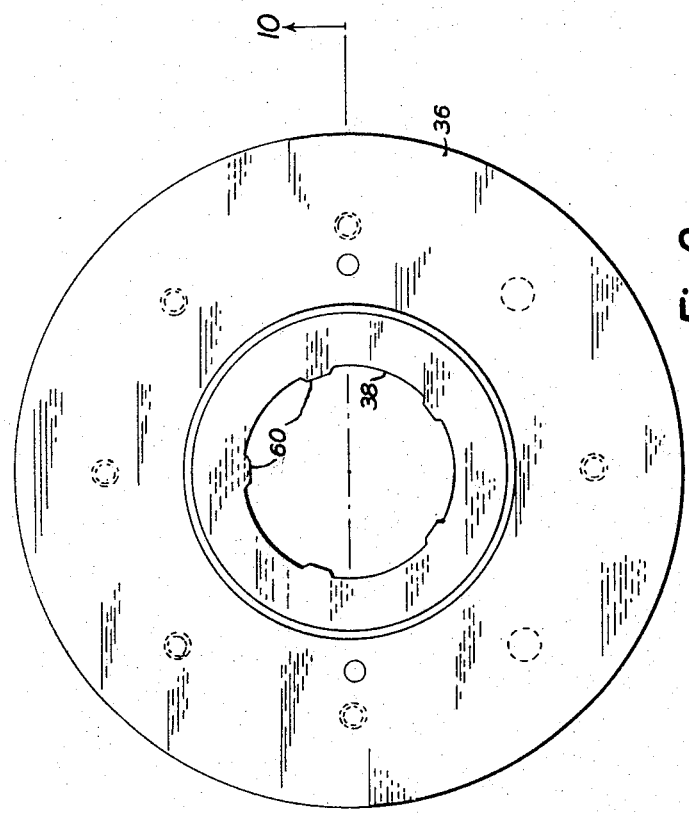
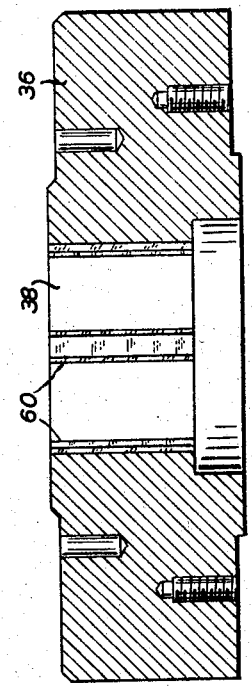
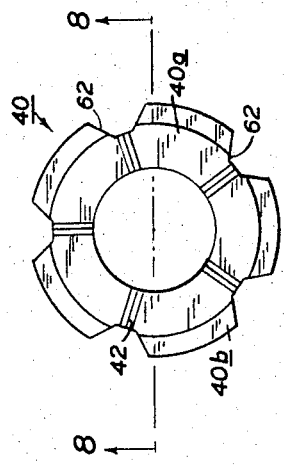
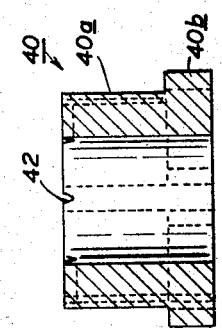
INVENTOR.
BENT WERDELIN LARSEN
BY
Ralph R. Roberts
AGENT 3,454,188
Patented July 8, 1969

1

3,454,188
MEANS FOR WELDING BAIL EARS TO CONTAINERS
Bent Werdelin Larsen, 8, Ordrupgardsvej,
Charlottenlund, Denmark
Filed Jan. 23, 1967, Ser. No. 610,961
Int. Cl. B69d 25/32
U.S. Cl. 220—91                            2 Claims

ABSTRACT OF THE DISCLOSURE

The bail ears of this invention are particularly formed so that they may be attached to the wall of an electrical current-carrying container by means of projection welding. These ears and the method of making the ears contemplate that the projections extending from the face of the flange of the ear are formed as a fold of metal so as to increase the thickness of the projection rather than stretching and forming the projection by a punch thereby reducing the outward portions of projection thickness.

CROSS-REFERENCE TO A RELATED U.S. PATENT APPLICATION

Reference is hereby made to U.S. patent application, Ser. No. 557,984 filed June 16, 1966 for Welding of Mountings on Hollow Sheet Metal Bodies in which is disclosed an apparatus particularly adapted to weld to can bodies the ears of this invention.

BACKGROUND OF THE INVENTION

Field of the invention

The bail ear of this invention relates generally to the field of art of the class of metallic receptacles and particularly to bail ears and their mechanical features and configurations as found in the sub-class identified as bail ears. The method of forming this bail ear is found in the general class of metal deforming and particularly is found in those processes in which there is a deforming of sheet material. As the ear of this invention is contemplated as preferably being done in a compound or multiple die the method is applicable to the art in the sub-class of methods in which the forming is by three or more relatively movable tools. The die or tool of this invention having a plurality of moving members is found in the sub-class in which a device has a plurality of tools, each having a face portion designed and intended to engage the workpiece and with the deforming forces some time during their operation forming the projections by drawing a determined portion of the flange into a prescribed wrinkle formation and orientation.

Description of the prior art

Projection welding of ears to containers is known to the art and an exemplification of such a process is shown in the Patent to Garver et al., U.S. Patent 3,233,072 issued Feb. 1, 1966. In the apparatus described in the Garver patent as well as the ear shown in FIG. 1A thereof the projections on the ear are formed by forcing a punch through the flange portion of the ear. In like manner projections on ears are shown as being adapted for welding to can bodies or can members in the U.S. patent to Goldworthy, No. 2,450,655 issued Oct. 5, 1948 and in the U.S. patent to Hall, No. 2,845,522 issued July 29, 1958. Metal embossments are also known in which punch projections are formed as the punch enters the flange portions of the ear but with the punch stopped at a determined point so as to not break through the metal being drawn into a projection. In particular the U.S. patent to King, No. 2,571,369 issued Oct. 16, 1951 and the U.S. patent to Curtiss, No. 3,158,285 issued Nov. 24, 1964 are typical examples of the prior art of metal embossments.

The welding of ears to container bodies has been a subject of commercial and patent attention for more than twenty years. However, several difficulties inherent to the process of spot welding is particularly noted in the welding of ears to containers and is prevalent in all known cases prior to the present invention. In particular the high heat of spot welding effects both the interior and exterior protective surfaces of the container. The wide spread use of water based paints which rust tin plate has reduced the use of tin plate and instead the plate has the exterior and interior surfaces coated with lacquer and the like. These coatings are usually of a specific composition adapted to resist the material being contained therein. The spot welding apparatus and methods for projection welding of the known art needs have a force means sufficient to cause any of the projectoins of the above-identified patents to penetrate the exterior coating of the containers. At about the same time as the penetration is made there is an application of a spot welding current to cause these projections to be welded to the side wall of the container. In this welding the thinner outer projections must first be melted before the full spot weld is made. The resultant welds require a length of time and heat sufficient for the metal wall of the container to be locally heated to such an extent as to cause a discoloration of the metal and a burning of the lacquer often sufficient to destroy a portion if not all of the covering ability of the lacquer surface of the interior of the container.

The development of series welding and the application thereto so as to provide a method of attaching ears to metal containers is exemplified in the apparatus shown and described in my U.S. patent application, Ser. No. 557,984 filed June 16, 1966. In this apparatus it is possible and practical to provide a welding cycle which may be as short as approximately one one-hundred-twentieth part of a second. In the use of a sixty cycle electrical service this makes the welding time for certain of the ears of this invention to require only one-half cycle of electric pulsation. This type of welding, of course, requires a corresponding increase in the amount of current. However, as the duration of heat application is so short, the resulting weld does not burn the lacquer on the inside of the container and the weld attachment of the ear to the metal body is highly satisfactory. Where the ear projections and the container wall are of substantially greater thicknesses the weld cycle time is increased but is substantially shorter than known similar welding cycles for similar ears and containers.

Insofar as is known, the ears as shown in the prior art patents above have projections that require a comparatively much longer welding cycle than the welding cycle of this invention. The additional time is necessary so that the projections, which may be irregularly sharp or which may be smoothly rounded, may penetrate and be fused with the side wall. This additional time is required so that the ears with thinner outer metal projections is first given an initial application of lower current to break down and start the melt of the thin outer metal after which the heavier metal adjacent the flange is heated with a higher current to fuse the ear to the wall. This sloped or varying current welding method requires a longer welding cycle to melt the thin and then the heavier portion of the projection as the projection approaches the side wall in its welding operation.

The projections of the ear of this invention have full strength and thickness to the extent of their projection and hence no "slope" current application is necessary or desirable. Having the strength to penetrate the painted outer surface of the container and enter the metal wall of the container before and without the application of electrical current to provide heat, the projection permits the use of a maximum penetrating force and then uses only the minimum required welding cycle.

SUMMARY OF THE INVENTION

This invention provides three unique inventive concepts:

The first concept is a new and novel projection formed from and in the flange portion of the ear, which flange portion is formed of sufficient width to provide an engaging shoulder for the application of thrust of the ear against the wall of the container. Into this flange are formed projections made by inducing the wrinkles formed in the drawing of the ear to be caused to fall into a precise spaced pattern and by controlling this formation of the flange these projections are caused to be formed with a sharp point substantially, if not directly, under the side wall of the ear. This novel projection has the metal of the flange folded so that in the formation thereof it is brought nearly to or beneath the side wall of the ear and also is formed with at least a double thickness of the sheet metal from which the ear is formed.

The second novel concept of this invention is the die by which this ear is preferably formed, said die hereinafter being more fully described as a compound die in which the face of the flange forming die is provided with V-notches within which the surplus drawn material is caused to be precisely wrinkled and folded upon itself to form full strength projections.

The third novel concept of this invention resides in the method of forming the ear with the projections adjacent or beneath the side wall and in the forming becoming a part of the flange of the ear. It is therefore an object of this invention to provide an ear, easy to manufacture and which can be made in one compound die, said ear having full strength projections formed with at least a double side wall, the projection having generally a thickness equal to at least twice the thickness of the flange.

It is a further object of this invention to provide an ear in which the periphery of the blank for the ear may have cutouts provided therein whereby the projections are formed at these points of cutout and are accordingly brought closer to the side wall and closer to the flange, that is to say, that the projections will be shorter in extent and will move closer to the plane of the wall of the ear.

It is a further object of this invention to provide a method for the forming of this ear in a simple and precise manner, the ear as formed by this method having projections in which the material is folded rather than decreased or stretched and in which the projections are brought substantially in line with the plane of the side wall of the domed portion of the ear.

It is still a further object to provide a tool or die in which by compound action the ear may be blanked, drawn and the flange and projections formed in one stroke, and die being capable of being run at high speed to produce precisely formed ears.

There has been outlined rather broadly the most important features of the ear, the tool for forming the ear and the method of forming the ear of the present invention in order that the improvement to the present art may be better appreciated. Those persons skilled in the art will appreciate that the conception on which the present disclosure is based may be utilized as the basis for designing other structures for carrying out the several purposes of this invention.

A specific embodiment, a specific tool and a modificacation thereof and a specific method have been chosen for purposes of illustration and description, and is shown in the accompanying drawings forming a part of the specification.

BRIEF DESCRIPTION OF THE DRAWINGS

FIG. 6 represents a sectional view of a compound die adapted to produce an ear generally of the configuration of FIG. 1;

FIG. 7 represents a plan view of a fluted, projection-forming block adapted to accept and form blanks having cutouts in the periphery of the ear blank;

FIG. 8 represents a sectional side view of the forming block and looking in the direction of the arrows and taken on the line 8—8 of FIG. 7;

FIG. 9 represents a plan view of the female periphery-forming and blanking die;

FIG. 10 represents a sectional side view of the female blanking die and looking in the direction of the arrows and taken on the line 10—10 of FIG. 9; and FIG. 11 represents an isometric view of a projection-forming member of the die of FIG. 6.

DESCRIPTION OF THE PREFERRED EMBODIMENT AND MODIFICATION

Figure 3:
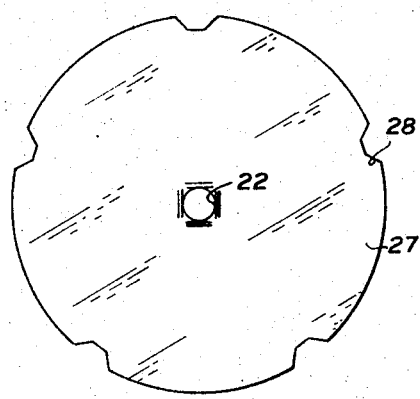
FIG. 3 represents a plan view of an ear blank after it is die cut to size and before the drawing of the ear to its final shape.
Figure 1:
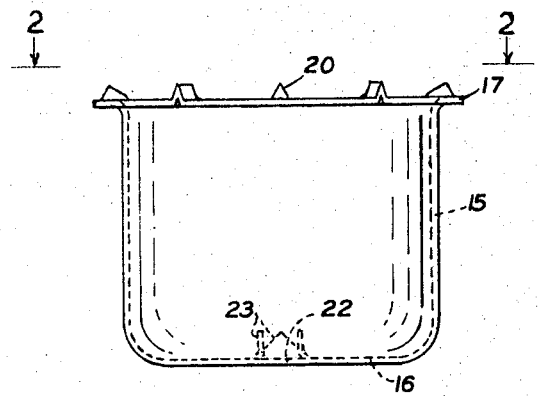
FIG. 1 represents in an enlarged scale a side view of a bail ear of this invention.
Figure 2:
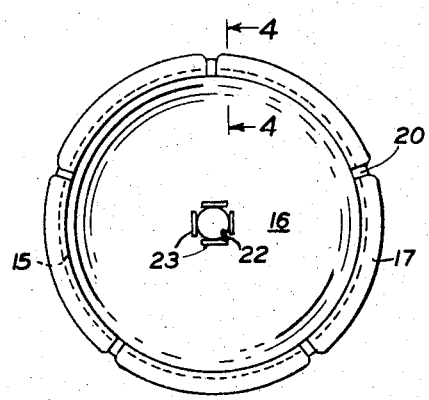
FIG. 2 represents a plan view looking in the direction of the arrows and into the ear shown in FIG. 1.

Referring now in particular to the drawings in which like numbers refer to like members throughout the several figures and in particular to FIGS. 1, 2 and 3 in which a bail ear has a side wall 15 of circular configuration which wall is continued into an end portion 16. The other portion of the wall joins and is extended outwardly into a narrow flange 17 portion. The flange continuity is interrupted by the formation therein of a plurality of projections 20 mroe fully seen in FIGS. 4 and 5. Substantially central of the wall 15 there is formed in end 16 a bail end opening 22 which in the present instance is made with a four-sided pointed punch of rounded outer configuration which produces a substantially round hole with four inturned metal portions 23. The internal hole is rounded by the body of the punch to the configuration substantially as shown in FIG. 2. Although other hole forming means may be used, in the present embodiment it is preferred that a portion of the end 16 be turned inwardly and sized to provide a bearing surface to retain and pivotally support the end of a bail (not shown).

Figure 4:
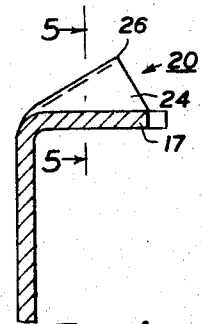
FIG. 4 represents a fragmentary side view partly in section and in an enlarged scale of a projection of the ear, the view taken on the line 4—4 of FIG. 2.
Figure 5:
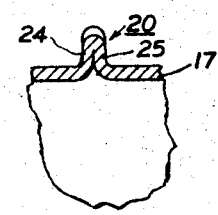
FIG. 5 represents a sectional view taken on the line 5—5 of the projection of FIG. 4.

Referring next to FIGS. 4 and 5, there is shown in greater detail one of the projections 20 provided on this ear, each projection being a fold of a portion of the flange 17. The sides 24 and 25 of the projection are the same thickness as the flange 17 which is the thickness of the material from which the ear is made. The extension of the projection from the flange is determined by the amount of material provided for the projection. As folded, the projection peaks to form a sharp point at 26 which point may be made closer to or farther from the wall 15 or closer to or farther from flange 20 by forming a blank 27 with or without cutouts 28 as seen in FIG. 3.

As reduced to practice, the ears are made in many sizes and thickness to accommodate containers ranging from one to seven gallons in size. For a one-gallon container the ear blank is made with cutouts 28 so that the resulting projection 20 extends about thirty thousandths of an inch beyond flange 17 which is about twelve thousandths of an inch thick. After the forming of the ear, the flange has a fifteen-sixteenths inch outside diameter and about a three-quarter inch inside diameter. This flange of about three-thirty seconds width has the peak or point 26 about one-thirty second of an inch from the outside edge. These projections have little height in relationship to their thickness of about twenty-five to thirty thousandths. This projection is therefore sufficiently strong to accept a thrust load sufficient to penetrate the lithographed cover of the container and to impinge the metal of the wall for a good electrical connection at the time of welding to the container.

In certain instances it is desirable to have a greater projection on these one-gallon ears in which case no cutouts are made in the blank and as the projection is extended further the strength of the projection is increased by using a heavier gauge material, as for example, a sheet metal about sixteen thousandths of an inch thick. The projection thus formed extends about forty-five thousandths of an inch and the peak or point is now about one-sixty-fourth of an inch toward the outer flange edge. As the projection is heavier and extends further from the flange the weld time for the projection is made slightly greater thereby causing an increase in the size of the weld marks and the risk to the lacquer coating is increased.

In yet other sizes of ears, as for example, for five-gallon containers, ears are made of material about sixteen thousandths of an inch thick and with no cutouts. The projections formed in the flange extend about forty-five thousandths of an inch from the face of the flange and when welding to a can body of like or heavier thickness the welding cycle may be extended to one-twenty-fifth of a second. This ear can be made with cutouts which results in the projection point moving inwardly so that the exterior weld marks are covered by the flange.

In yet another ear for attachment to five-gallon cans the ear is made of about twenty-three thousandths of an inch thick material. In this ear cutouts are provided so that the amount of material drawn to form the projection is kept to a minimum. These projections extend about fifty thousandths of an inch from the face of flange and the projection is about midway between the inner and outer edge of the flange. This ear as presently used is made with an outside flange diameter of about one and one-quarter inches with an inside diameter of about one inch diameter.

During the welding of the ear to the container body a determined amount of heat is produced at each projection and where the outside of the container is lithographed it is desirable to not damage the effort made in lithographing. For this reason, it is practicable that cutouts be made in the blank so that the projection can be moved inwardly toward the wall of the ear whence the resultant weld cycle results in the projection welds being covered or nearly covered by the flange.

In the forming of the ear and the projections extending from the flange it is important that the projections be of sufficient strength so that the full application of thrust can be made at the time of attachment of the ear to he container. The full thrust force insures complete penetration of the coating of the outer container surface and a positive welding contact of the body and ear projections. In this condition the maximum welding current necessary to make the weld is applied without arcing and consequent burning.

Referring next to FIG. 6 there is shown a compound die as used for the cutting and forming of the ear in one stroke of the press. To a movable upper die block 30 is mounted a punch 32 sized to cut the outer periphery of the blank 27 to the selected shape and size. To a fixed lower die block 34 is attached a die 36 having a hole 38 sized to cooperatively receive the punch 32. Spring-biased upwardly and slidably carried in hole 38 is a forming block 40 having a shoulder adapted to limit the upward movement of the block and having in its upper surface a plurality of V-grooves 42 for the positioning and shaping of projections 20.

Slidable in a central guideway 44 in block 40 is a dome forming and drawing punch 46 having a punch receiving opening 48 therethrough. Punch 46 is clamped in position and against lower die block 34 and is sized so that with the material of the ear it enters a die hole 50 centrally formed in punch 32. Slidable in die hole 50 is a shouldered knock-out 52 having a hole axially aligned with its slidable movement. A punch 54 having an end beveled to form a four-sided point is fixedly mounted to move with the upper die shoe. This punch is axially slidable in die hole 50. Attached to the die 36 is a strip guide and hold-down 56 arranged in a conventional manner to provide a guide for a strip of stock as it is fed to the die and for retaining the stock scrap against the die 36 during and after forming the ear.

When as a matter of selection it is determined that the blank 27 is to have cutouts 28 in its periphery the lower die 36 is made as shown in FIGS. 9 and 10 and the forming block 40 slidable therein is made as shown in FIGS. 7 and 8. As seen in FIGS. 9 and 10 the die 36 has hole 38 formed with splines 60 axially formed in the general diameter of the hole. These splines provide the size and shape of cutouts 28 in the blank 27. The punch 32 of FIG. 6 is shaped with flutes corresponding to the splines and sized to provide the shearing clearances normal for punching metal of the thickness of the strip stock.

The forming block 40 is made with flutes 62 which, as shown, extend from the body portion 40a through the flange portion 40b. These flutes are symmetrically spaced adjacent the V-grooves 42 and also provide an orienting means for the block 40 as it slides in hole 38. It is noted that the punch 32 has its lower body portion exteriorly shaped as body portion 40a of block 40. The face of the punch 32, of course, does not have any V-grooves.

The blank 27 when formed with no cutouts has the forming block 140 made as seen in FIG. 11 in which the body portion 140c is made without flutes and the flange 140d is likewise absent any flutes but has V-grooves 142 formed in the face of the block. The hole 38 in die 36 is round as is the exterior surface of the punch 32.

FORMING OF AN EAR IN COMPOUND DIE

Referring particularly to FIG. 6 into which die assembly an ear 20 is formed in one stroke as follows: a strip or blank of metal (not shown) and of desired thickness is fed between hold-down 56 and the top surface of die 36. The upper die block 30 is moved toward lower die 34 and punch 32 engages the metal strip and shears or punches a blank 27 into the hole 38 of die 36. Form block 40 or 140 which is spring biased upwardly by a spring means 66 which, as shown, is a multiplicity of "Belleville" type spring washers. These washers are adjustably tensioned by nuts 68. The blank after shearing is gripped between block 40 and punch 32 as the punch moves downwardly whereupon the drawing punch 46 engages and draws the dome-shaped portion of the ear.

At the same time as the punch 46 is shaping and drawing the dome-shaped portion of the ear, the punch 54 and its sharpened end enters and pierces the end portion 16 to form and shape bail opening 22 in the ear. The punch engaged ear is maintained by the punch 54 in symmetrical relationship on the drawing punch 46 as the ear shaping is continued. The increasing spring pressure of spring means 66 insures that the drawn dome is substantially wrinkle-free and as the outer portions of the outer blank are drawn inwardly the surplus of the outer blank is forced into the V-notches 42 to form the projections. The V-shape is used so that the exterior or peak portion of the projection is shaped into a relatively sharp member.

After completion of the forming of the ear the spring means 66 urges block 40 upwardly to strip the ear from drawing punch 46 while at the same time the ear is usually held on bail opening punch 54 in the upper die assembly. To strip the ear from punch 54 the knock-out 52 is urged downwardly by means of pusher 70 and dowels 72 in engagement with the upper surface of the knock-out which is moved to the down position shown in FIG. 6.

It is contemplated that the ears of this invention may be attached to steel plate of eight thousandths thickness and with a temper commercially identified as numbers four and more. In contrast to the now presently used ten and one-half thousandths annealed tin plate, the as produced eight thousandths of an inch plate in addition to the annealing expense provides a potential saving of about twelve and one-half percent in the material cost of each container. The projection welds using the ears of this invention on the eight thousandths thick material are similar to the welds on conventional ten and one-half thousandths material but the welding cycle time required is potentially shorter in duration.

METHOD

Although the making of the ear is preferably in the compound die above-described, it is to be noted that the steps of making the ear may be performed by other than the die described above. For example, a progressive die or a transfer die may be used to form the ear shown in FIGS. 1 through 5. It is only necessary that the following steps be followed in the method of making the ear:

*Cutting* a flat blank of sheet metal of determined outer configuration, size and thickness;

*Punching* the center of the blank to shape a bail-receiving opening;

*Drawing* the central portion of the blank into a dome or crowned portion and the outer portion of the blank into a narrow flange portion; and

*Forming* the surplus of the outer blank portion into predeterminedly located projections having peaked points and side walls of substantially the same thickness as the stock from which the ear is made.

The ear of this invention need not be round as shown but may instead be square, rectangular or any other shape. It is only necessary that a bail-retaining means be provided in the ear and that in the flange there be at least one projection formed by wrinkling or folding the sheet material so that the projection is of dual wall thickness.

Descriptive terms such as "up," "down," "in," "out" and similar terms are applicable to the ear, tool and method as described in conjunction with the accompanying drawings and such terms are used merely for the purpose of description and do not necessarily apply to a position in which the ear and tool may be constructed or used.

I claim:

1. A sheet metal bail ear of unitary construction and adapted for projection welding to the side wall of a container, said ear including (a) a sheet metal body having an end portion and a side wall extending therefrom; (b) a narrow flange portion disposed at the other end of the side wall and extending outwardly therefrom, and (c) at least three sharply pointed projection members formed in the flange portion and folded into a tapered configuration as a double thickness of the sheet metal, the double thickness disposed adjacent each other and the sharp point of the projection being the vertex of the tapered configuration with the folded edge of the projection extending from a point at the juncture of the side wall and flange and sloping outwardly from the side wall to the sharp point, which point is positioned between the inner and outer peripheries of the flange, the folded edge of the projection being not greater in length than the width of the flange.

2. A sheet metal bail ear as in claim 1 in which the folded edge of each projection is less than the width of the flange.

References Cited

UNITED STATES PATENTS

| | | | |
|---|---|---|---|
| 904,540 | 11/1908 | Lachman | 219—93 |
| 1,190,208 | 7/1916 | Williams | 219—93 X |
| 1,670,131 | 5/1928 | Allerton | 220—91 |
| 2,021,173 | 11/1935 | Clark | 219—93 X |
| 3,158,285 | 11/1964 | Curtiss | 220—91 |

RAPHAEL H. SCHWARTZ, *Primary Examiner.*